United States Patent [19]
Baggett et al.

[11] Patent Number: 5,694,131
[45] Date of Patent: Dec. 2, 1997

[54] METHOD AND APPARATUS FOR DETECTING MULTIPATH INTERFERENCE IN A RADAR RECEIVER

[75] Inventors: Don W. Baggett, Orange; Luis A. Garcia, San Gabriel; Magdalene Ling, Los Angeles, all of Calif.

[73] Assignee: Hughes Electronics, Los Angeles, Calif.

[21] Appl. No.: 609,403

[22] Filed: Mar. 1, 1996

[51] Int. Cl.$^6$ ..................................... G01S 7/292
[52] U.S. Cl. .................. 342/148; 342/152; 342/162; 342/194; 342/196
[58] Field of Search ................... 342/148, 152, 342/159, 162, 194, 196, 192

[56] References Cited

U.S. PATENT DOCUMENTS

| | | | |
|---|---|---|---|
| 4,067,014 | 1/1978 | Wheeler et al. | 342/418 |
| 4,449,127 | 5/1984 | Sanchez | 342/80 |
| 4,587,523 | 5/1986 | Shupe | 342/95 |
| 4,789,861 | 12/1988 | Baggett et al. | 342/152 |
| 5,371,506 | 12/1994 | Yu et al. | 342/380 |
| 5,495,249 | 2/1996 | Chazelle et al. | 342/36 |
| 5,604,503 | 2/1997 | Fowler et al. | 342/378 |
| 5,633,643 | 5/1997 | Erhage | 342/159 |

*Primary Examiner*—John B. Sotomayor
*Attorney, Agent, or Firm*—Leonard A. Alkov; Wanda K. Denson-Low

[57] ABSTRACT

A method and apparatus for detecting the presence of multipath interference within a radar receiver disposed to form sum ($\Sigma$) and difference ($\Delta$) signals by time-sampling a target return signal is disclosed herein. In accordance with this method there is formed a sequence of complex conjugates ($\Sigma^*$) of the sum signals ($\Sigma$). Each of the $\Sigma^*$ signals is multiplied with an associated one of the $\Delta$ signals so as to form a time-sampled sequence of $\Sigma^*\Delta$ signals. A power spectrum representation of the time-sampled sequence of signals $\Sigma^*\Delta$ is then generated, wherein the presence of selected spectral components within the $\Sigma^*\Delta$ power spectrum indicate the existence of multipath interference within the radar receiver. In a particular implementation the $\Sigma^*\Delta$ power spectrum representation is quickly and reliably determined by performing a Fast Fourier Transform (FFT) operation upon the time-sampled sequence of $\Sigma^*\Delta$ signals.

10 Claims, 5 Drawing Sheets

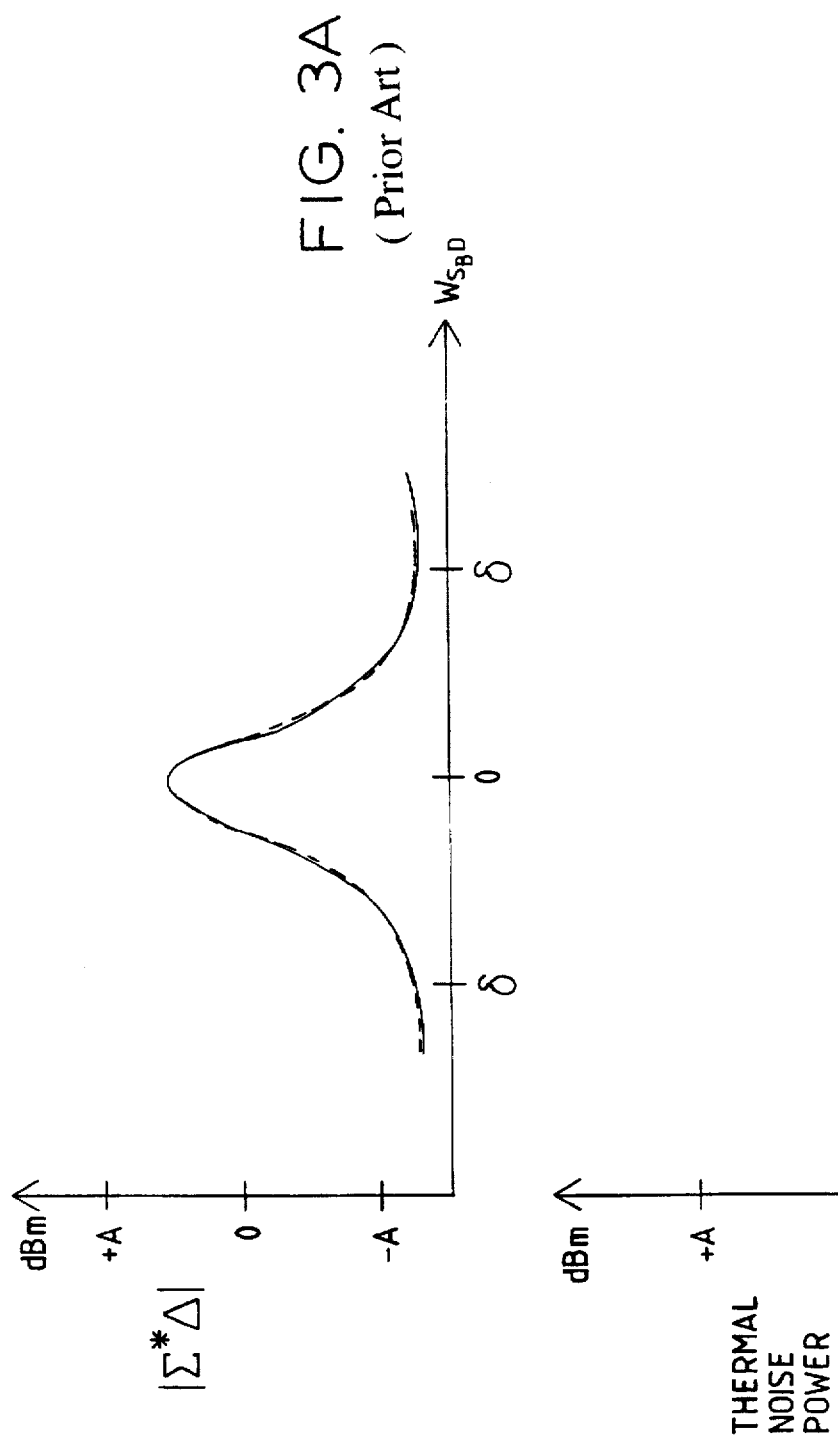

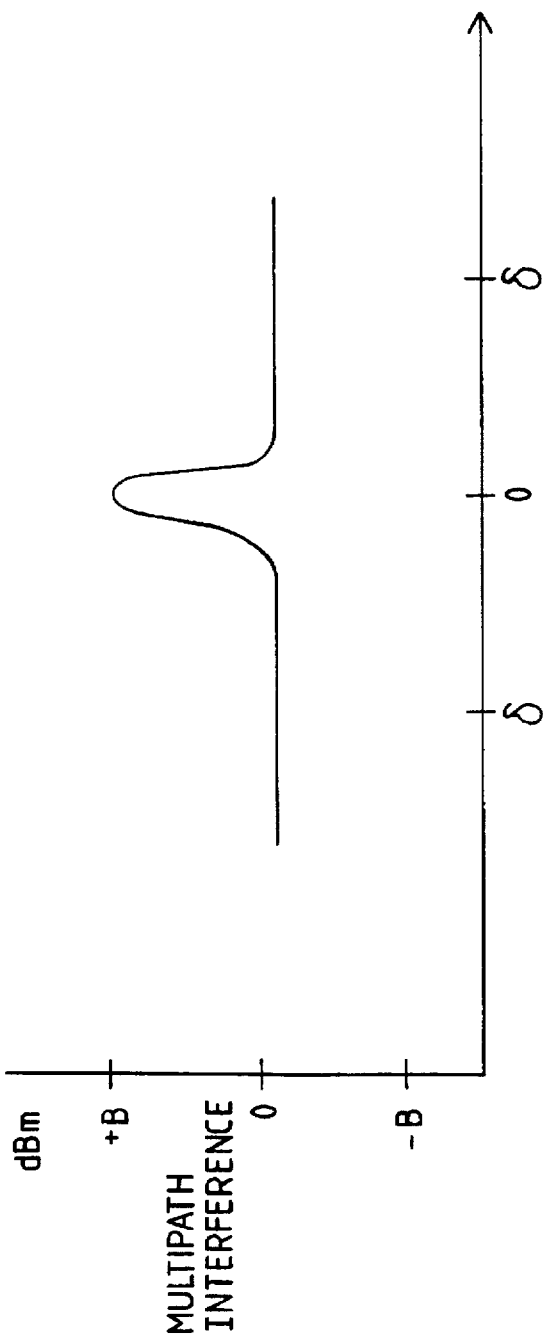
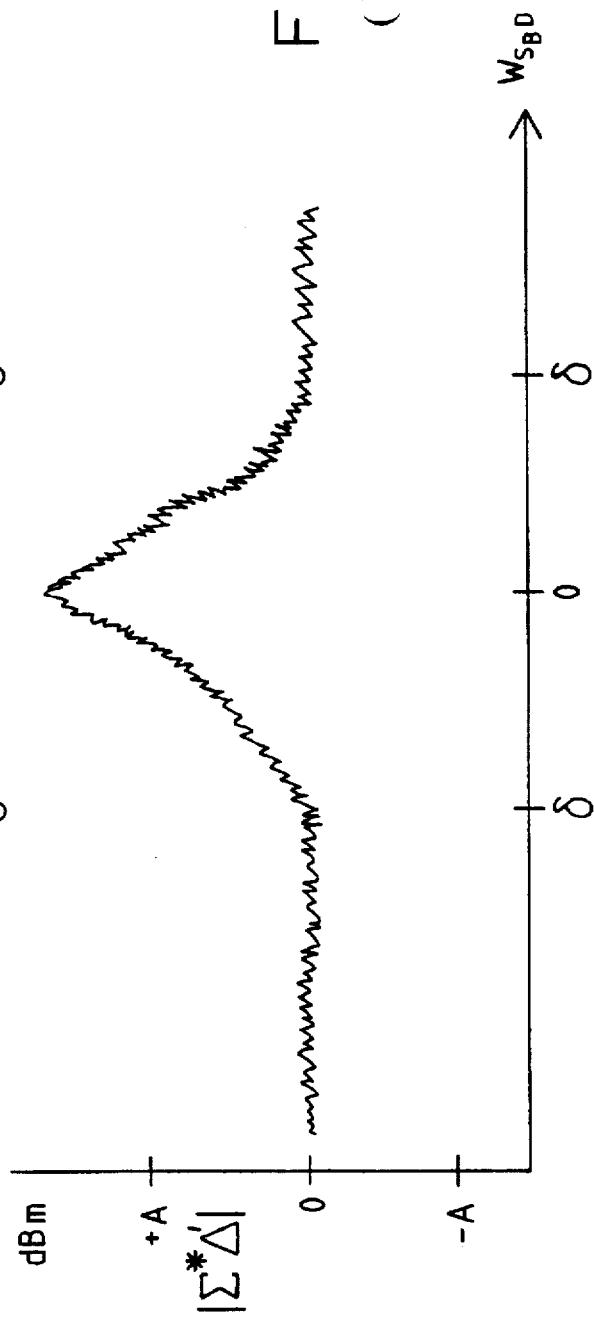

METHOD AND APPARATUS FOR DETECTING MULTIPATH INTERFERENCE IN A RADAR RECEIVER

BACKGROUND OF THE INVENTION

1. Field of the Invention

This invention relates generally to radar systems, and more particularly to the detection of multipath interference in a radar receiver.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

In a monopulse radar receiver, sum and difference signals are formed from plural antenna beams. The difference signal is representative of the tracking error, i.e., the angle that the target being tracked is off the boresight line of the antenna, and is therefore used for automatic tracking. In some radar systems, usually those employing a single target track mode, a search scan operation precedes the automatic tracking mode. After target acquisition, the search scan mode is terminated and the antenna is trained on the target by the automatic tracking equipment.

Other radar systems employ a "track while scan" mode of operation, in which the position of one or more targets is continually tracked on the basis of the data received while simultaneously performing a search scan. In a track while scan system, it is necessary that the equipment be able to detect when a target being tracked is out of the beam of the antenna so that the track can be deleted. In a search and track radar, detection of an out of beam condition enables the target to be reacquired by switching to the scanning mode.

Most existing techniques for detecting an out of beam condition are based upon the signal to noise ratio of the radar return signal and do not permit the direction of the target from the boresight to be ascertained. However, the signal-to-noise ratio is an ambiguous indicator of an out of beam condition. The signal-to-noise ratio may drop due to other factors such as ground clutter, thermal noise, jamming or changes in atmospheric condition. To minimize the likelihood of an ambiguity, it is generally necessary to monitor the signal-to-noise ratio over lengthy time intervals.

One method of detecting an out of beam condition that does not require monitoring of the signal-to-noise ratio for an extended period of time is disclosed in U.S. Pat. No. 4,789,861, entitled METHOD AND APPARATUS FOR DETECTING AN OUT OF BEAM CONDITION IN A MONOPULSE RADAR RECEIVER, issued Dec. 6, 1988, to Baggett et al., (hereinafter, the '861 patent), the teachings of which are incorporated herein by reference.

The '861 patent discloses a method and apparatus for deriving a pair of signatures from the sum and difference signals of a monopulse radar receiver that indicate when a target being tracked moves out of the center of the tracking beam.

Although processing sum and difference signals in this manner generally allows accurate detection of an out of beam condition. Sum and difference signals are known to be susceptible to multipath interference. Multipath interference is generally known in the art to consist of radar return pulses reflected by objects other than the intended target.

As an example, in airborne radar systems designed to track low-altitude, airborne targets pronounced multipath interference sometimes exists due to reflections of the tracking beam from ground terrain or water. Since satisfactory results have not been obtained using existing multipath detection techniques, it has been necessary to direct the tracking beam away from the ground even in the absence of significant multipath interference. This "off-boresight" tracking method results in a reduction in the received power, thereby reducing the signal-to-noise ratio and degrading tracking performance over terrain not inducing appreciable multipath interference.

Although various techniques have been proposed for correction of multipath interference, these have generally required either the provision of additional antenna elements or expensive retrofit of existing radar systems.

Accordingly, a need exists in the art for a system and technique for sensing the presence of multipath interference in a radar receiver, and, more particularly, for detecting the corruption of sum and difference signals caused by multipath interference.

SUMMARY OF THE INVENTION

The need in the art is addressed by the present invention which provides a method and an apparatus for detecting the presence of multipath interference in signals produced from combinations of antenna elements. In this particular embodiment of the invention the conventional sum ($\Sigma$) and difference ($\Delta$) signals are formed in the radar receiver by time sampling a target return. In accordance with the invention, a sequence of complex conjugates ($\Sigma^*$) of the sum signals ($\Sigma$) is formed. Each of the $\Sigma^*$ signals is multiplied with a $\Delta$ signal so as to form a time-sampled sequence of $\Sigma^*\Delta$ signals. This is done so that the power spectrum of the autocorrelation function of one signal can be generated. This is not equal to the cross-correlation of the two signals (sum and difference), which is sometimes examined for the presence of mutipath. A power spectrum representation of the time-sampled sequence of processed signals $\Sigma^*\Delta$ is then generated. The presence of selected spectral components within the $\Sigma^*\Delta$ power spectrum is indicative of the existence of multipath interference within the radar receiver.

The present invention allows the $\Sigma^*\Delta$ power spectrum representation to be quickly and reliably determined by examining the power spectral density of the complex-valued $\Sigma^*\Delta$ signal. In an exemplary embodiment a Fourier Transform, Fast Fourier Transform (FFT) or like operation is performed upon the time-sampled sequence of $\Sigma^*\Delta$ signals to determine the $\Sigma^*\Delta$ power spectrum representation.

BRIEF DESCRIPTION OF THE DRAWINGS

FIG. 3A shows a frequency domain representation of the sequence of FIG. 2 for thermal noise.

FIG. 3B depicts a spectral representation of a target plus thermal noise producing a higher spectrum near zero frequency (like shrugged shoulders).

FIG. 3C depicts the multipath interference in the received $\Sigma^*\Delta$ signal. Note that the effect of multipath interferences is to overwhelm the effect of thermal noise.

FIG. 3D depicts a superposition of all three: thermal noise, target and target corrupted by multipath.

DETAILED DESCRIPTION OF THE INVENTION

Figure 1:
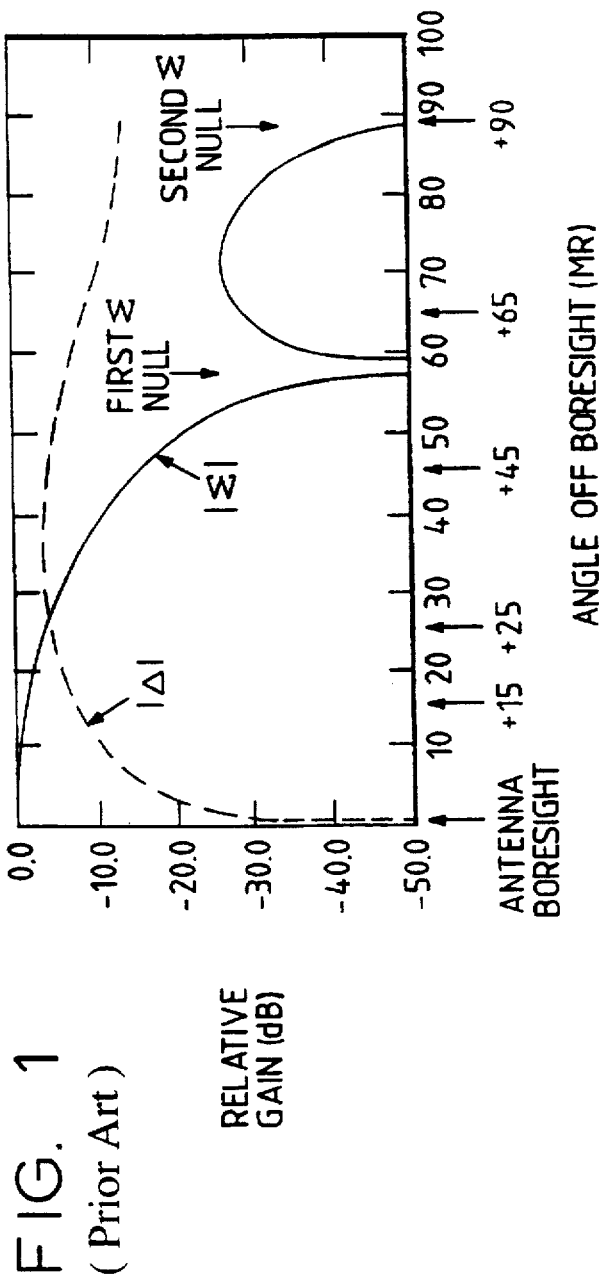
FIG. 1 graphically represents the absolute values of sum ($\Sigma$) and difference ($\Delta$) signals as a function of angular offset in milliradians from the boresight of a radar antenna array from which the signals are derived.

FIG. 1 graphically represents the absolute values of sum ($\Sigma$) and difference ($\Delta$) signals as a function of angular offset in milliradians from the boresight of a radar antenna array from which the signals are derived. The solid line represents the absolute value of a sum signal, $\Sigma$, as a function of angular offset in milliradians from the boresight of a radar antenna array from which the sum signal is derived. Similarly, the dashed line in FIG. 1 represents the absolute value of the difference signal, $\Delta$, as a function of angular-offset boresight in milliradians. As depicted, the sum and difference signals in FIG. 1 may correspond either to the $\Sigma_{AZ}$ and $\Delta_{AZ}$ signals from the azimuth antenna array, or to the $\Sigma_{EL}$ and $\Delta_{EL}$ signals derived from the elevational array. As mentioned in the Background of the Invention, existing radar systems do not process sum and difference signals such as those shown in FIG. 1, in a manner enabling determination of the extent to which multipath interference has contributed to their respective magnitudes. As is described below, a series of vector products $\Sigma^* \Delta$ hereinafter denoted as sum-bar-delta ($S_B D$) signals, where * denotes complex conjugation, are processed in accordance with the invention to detect the existence of multipath interference.

Figure 2:
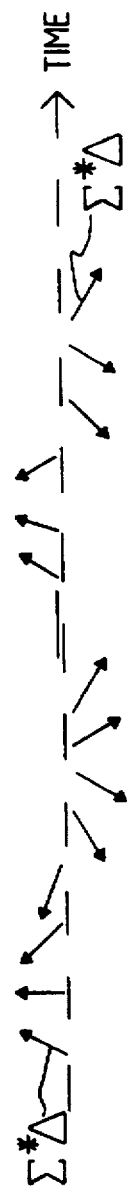
FIG. 2 shows a plurality of $S_B D$ vector products ($\Sigma^*\Delta$) formed from $\Delta$ and $\Sigma$ signals corresponding to a single target range and Doppler frequency.

FIG. 2 shows a plurality of vector products $\Sigma^* \Delta$ formed from a time sequence of $\Delta$ and $\Sigma$ signals obtained from a single target range and Doppler frequency. If the angular extent of the target is assumed to vary about $\omega_T = 0$ (i.e., DC) frequency range $+/-\delta$ for a predefined sampling time, then the time variation in phase, i.e., the deviation in frequency, of the $S_B D$ signal will span the frequency range $+/-\delta$. It follows that the magnitude of frequency components of the $S_B D$ signal outside of the range $\omega_T - \delta < 0 < \delta$ will in large part be due to thermal noise. Although the value of $\delta$ will depend upon target rotation rate and size, it is believed that $\delta$ will generally be within the frequency range of $+/-10$ Hz. As will be made apparent by the following description of FIGS. 3A–3D, it is a feature of the present invention that the presence of multipath interference may be determined by analyzing the spectral representation of the time sequence of $S_B D$ signals formed from a time sequence of sum and delta signals.

FIG. 3A depicts a spectral representation of a signal $\Sigma^* \Delta$ for ambient thermal noise.

FIG. 3B shows a frequency domain representation of the sequence of FIG. 2 with a target present and in the absence of multipath interference. It is believed that the "shrugged shoulders" in the magnitude of $\Sigma^* \Delta$ between the frequencies of $-\delta < 0 < \delta$ may arise as a consequence of the target being composed of a number of different reflective elements. However an understanding of the actual cause of their appearance within the spectrum of FIG. 3A is not necessary for an understanding of the invention. In like manner as shown in FIG. 3C, the spectral magnitude of multipath interference in the received $\Sigma^* \Delta$ signal forms a sharp peak (with no shoulders) between the frequencies of $-\delta < 0 < \delta$. The superposition of FIGS. 3A–3C is depicted in FIG. 3D.

The frequency domain representation of FIG. 3D is based upon a time sequence of sum and difference signals associated with the range gate and Doppler frequency of the target being tracked. Specifically, the signature of FIG. 3D represents the power $\Sigma^* \Delta$ of a sequence of $S_B D$ signals as a function of the angular frequency $\omega_S B_D$, where $\omega_S B_D$ denotes the time derivative of the phase of the $S_B D$ signal sequence. The magnitude of the spectral components within the range $-\delta < \omega_S B_D < \delta$ is determined by both the relative power of the radar return signal associated with the target and the angular extent of the target. It follows that the extent of multipath interference may be estimated by observing the shape of power spectra exemplified by FIG. 3D outside the frequency range $-\delta < \omega_S B_D < +\delta$. Alternatively, an estimate of the power of the received multipath interference could be derived by processing the spectrum of FIG. 3D using both a low-pass and a high-pass filter. In particular, the resultant filter output could be compared. When the low-pass and high-pass filters have relatively the same power multipath corruption is occurring. When the low-pass filter lies much higher than the high-pass filter multipath corruption is minimal bandwidth in order to approximate the extent of multipath interference.

Figure 4:
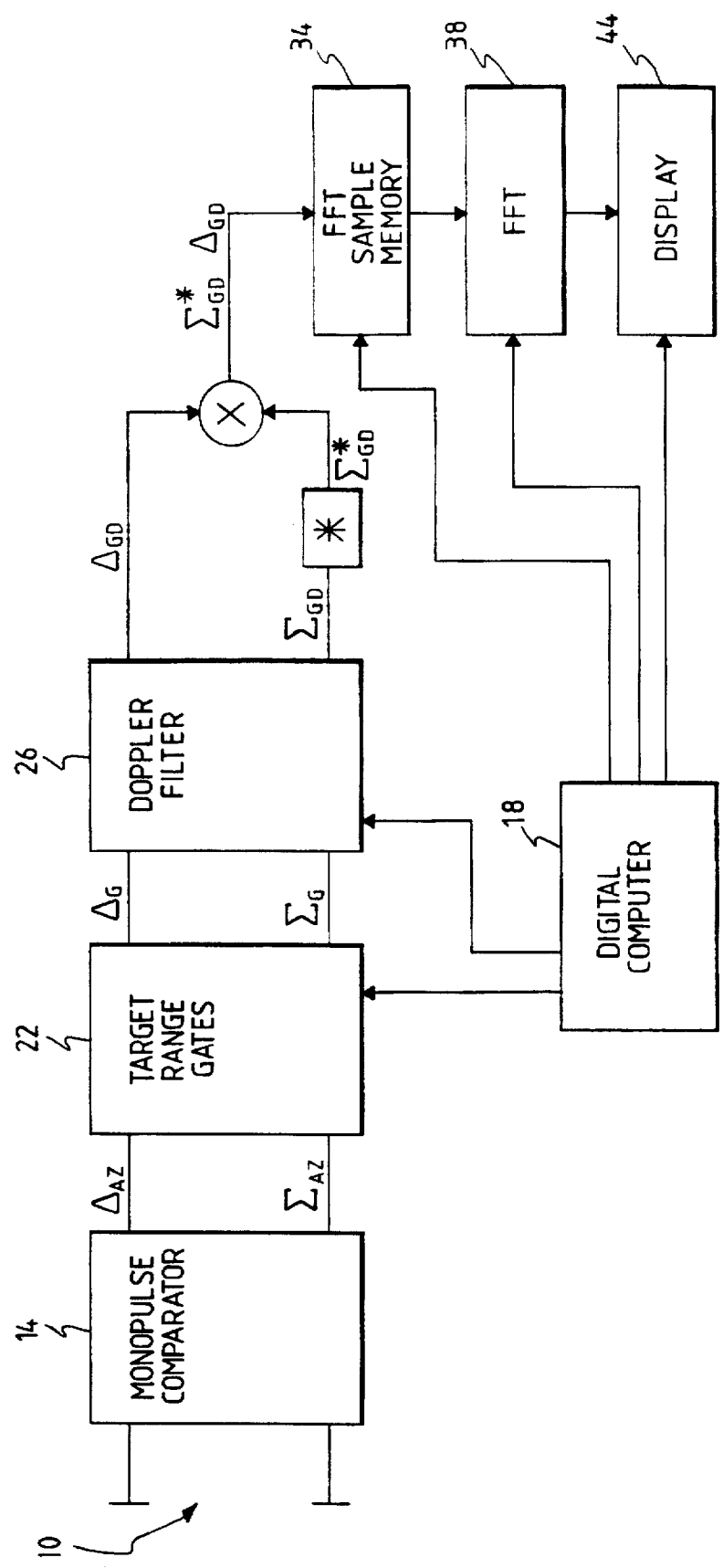
FIG. 4 shows an apparatus for implementing the multipath detection technique of the present invention.

Referring now to FIG. 4, there is shown an apparatus for implementing the multipath detection technique of the present invention. An antenna 10 which is segmented for reception purposes into four quadrants, i.e., two halves for each of the azimuth and elevation planes, intercepts a target return signal. For simplicity, the following description only treats one plane, i.e., azimuth. The same procedure is followed with respect to the elevation plane. Moreover, it is understood that the teachings of the invention are equally pertinent to radar systems in which arrays of antennas are used to receive radar signals.

Figure 5:
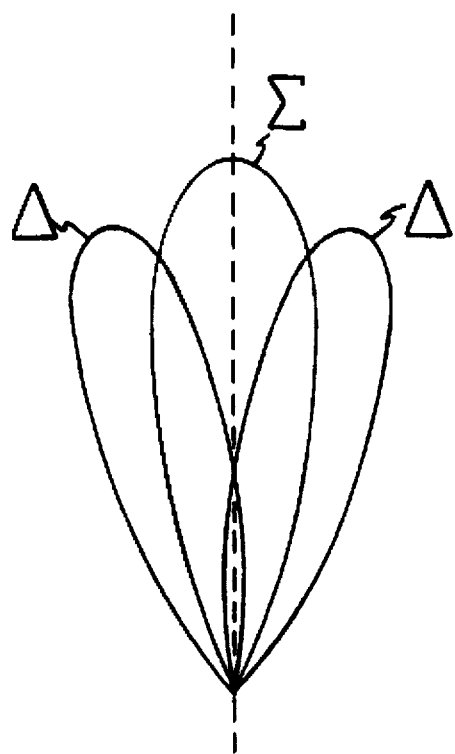
FIG. 5 provides an illustrative representation of the sum ($\Sigma$) and difference ($\Delta$) field patterns produced by a radar receive antenna.

Antenna 10 is preferably a two dimensional array having slotted elements and a tapered radiation pattern. More specifically, FIG. 5 provides an illustrative representation of the sum ($\Sigma$) and difference ($\Delta$) field patterns produced by the antenna 10. As is understood in the monopulse art, the developed sum signal is an even function about the boresight axis with a maximum response on the boresight axis. The difference signal is an odd function about the boresight axis with a characteristic null on the boresight axis. The target return signal intercepted by antenna 10 is processed into the sum and azimuth difference signals, $\Sigma_{AZ}$ and $\Delta_{AZ}$, by a conventional monopulse comparator 14 (FIG. 4). Monopulse comparator 14 combines the signals from each of the four antenna quadrants in order to generate the sum signal $\Sigma_{AZ}$. The difference signal $\Delta_{AZ}$ is conventionally produced by first adding the signals received by the "right" two quadrants, and subtracting therefrom the signal energy received by the "left" quadrants. The circuitry necessary for transmitting pulses in the direction of a target has been purposely excluded from FIG. 4 in that such circuitry is well known in the prior art.

In an exemplary embodiment a pulsed waveform that repeats every 100 microseconds is transmitted at a duty cycle of 1%, thereby allowing 99 range bins to be monitored for the presence of target return signals. Under these circumstances it requires approximately 12.8 milliseconds for an array of 128 Doppler filters to process the signals from each of the 100 range bins. This implementation provides 12,800, i.e., 100×128, potential target cells. One way to practice the invention is to use a small subset of cells (perhaps 4 to 6), to obtain the spectral representation of $\Sigma^* \Delta$. This is the method depicted in FIGS. 3A through 3D. However, there are many other combinations of cells which could be used to obtain the $\Sigma^* \Delta$ spectral representation. A subset of such cells (between 4 and 6 cells) identified as the "track gate" are monitored as is described hereinafter.

A digital computer 18, based on target coordinates and navigational data supplied thereto, operates to compute a range interval indicative of the distance between the antenna 10 and the target being tracked. The computer 18 provides a target range interval signal to the range gate 22 such that range-gated sum and difference signals $\Sigma_G$ and $\Delta_G$ from comparator 14 associated with the computed target range interval are supplied to a particular set of filters within a Doppler filter network 26. The filter network 26 includes two banks of Doppler filters, each including filter elements separately tuned to 128 Doppler frequencies, for filtering the sequence of signals $\Sigma_G$ and $\Delta_G$. The sum and difference signals (not represented) outside of the target range gate are also filtered by filter network 26. A sampled-time sequence of range-gated signals $\Sigma_{GD}$ and $\Delta_{GD}$ from the two filters tuned to the Doppler frequency of the target, as determined by the computer 18, are generated by the filter network 26. The sampled-time sequence of range-gated signals $\Sigma_{GD}$ and $\Delta_{GD}$ comprises the output of the track gate. In the exemplary embodiment described above, the track gate produces a pair of signals $\Sigma_{GD}$ and $\Delta_{GD}$ every 12.8 milliseconds.

The sequence of range gated sum signals $\Sigma_G$ are supplied to a complex conjugation circuit 30. The circuit 30 transforms each range-gated sum signal $\Sigma_G$ to its complex conjugate $\Sigma_G^*$. Multiplier 32 then produces a sampled time sequence of $S_BD$ signals by multiplying the ith range-gated sum signal $\Sigma_{GDi}$ with the $i^{th}$ range-gated difference signal $\Delta_{GDi}$ such that $S_BD_i=\Sigma_{GDi}\Delta_{GDi}$. The index "i" ranges from 1 to N, where N denotes the number of range-gated target returns received during a predefined FFT sampling interval.

The computer 18 then routes the N $S_BD_i$ signal samples to an FFT memory 34 during each of a contiguous set of FFT sampling intervals. In the preferred embodiment, approximately 256 samples (N=256) are collected during FFT sampling intervals of 3.3 seconds, i.e., one sample every 12.8 msec. It is expected that for acceptable resolution the number of FFT samples collected during each FFT sampling interval will typically need to be on the order of ten times the value of the frequency $\delta$.

At the conclusion of each FFT sampling interval a conventional FFT network 38 performs an N-point Fast Fourier Transform (FFT) upon the samples stored within the FFT memory 34. Based on the results of each FFT operation, a separate power spectrum of the type depicted in FIG. 3 is generated by a display device 44 during each FFT sampling interval. The series of power spectra produced by the display device 44 may then be analyzed in the manner described above in order to detect multipath interference.

It is noted that employment of an FFT routine to process the $S_BD$ signal samples requires generation of a radix 2 number of samples. Accordingly, in particular embodiments it may be desired to utilize instead a Discrete Fourier Transform (DFT) so as not to be constrained to utilization of a particular number of samples in creating a spectral representation of the $S_BD$ sample sequence.

While the present invention has been described herein with reference to a particular embodiment, it is understood that the invention is not limited thereto. The teachings of this invention may be utilized by one having ordinary skill in the art to make modifications within the scope thereof. For example, with access to the teachings herein those skilled in the art may be capable of formulating a multipath detection technique predicated upon the spectral signature generated from any combination of antenna elements. For example, the use of the product of the complex conjugate of the difference signal with the sum signal ($\Sigma^*\Delta$) would be another way to practice the invention.

It is therefore contemplated by the appended claims to cover any and all such modifications.

Accordingly,

What is claimed is:

1. A method for detecting multipath interference in a radar receiver comprising the steps of:

forming sum ($\Sigma$) and difference ($\Delta$) signals by time-sampling a target return signal;

forming the complex conjugate ($\Sigma^*$) of the sum signals;

multiplying ones of the $\Sigma^*$ signals with associated ones of the $\Delta$ signals so as to form a time-sampled sequence of $\Sigma^*\Delta$ signals;

generating a power spectrum representation of the time-sampled sequence of signals $\Sigma^*\Delta$; and identifying the presence of selected spectral components within said spectral representation indicative of the existence of multipath interference in said radar receiver.

2. The method of claim 1 wherein said step of generating a power spectrum representation includes the step of determining the Fourier transform of said time-sampled sequence of $\Sigma^*\Delta$ signals.

3. The method of claim 1 further including the step of estimating magnitude of said target return signal by low-pass filtering said power spectrum representation.

4. The method of claim 1 further including the step of estimating power of said multipath interference by integrating said spectral representation over a range defined by said selected spectral components.

5. An apparatus for detecting multipath interference in a radar receiver comprising:

means for forming sum ($\Sigma$) and difference ($\Delta$) signals by time-sampling a target return signal;

means for forming the complex conjugate ($\Sigma^*$) of the sum signals;

means for multiplying ones of the $\Sigma^*$ signals with associated ones of the $\Delta$ signals so as to form a time-sampled sequence of $\Sigma^*\Delta$ signals;

means for generating a power spectrum representation of the time-sampled sequence of signals $\Sigma^*\Delta$; and means for identifying the presence of selected spectral components within said spectral representation indicative of the existence of multipath interference in said radar receiver.

6. The apparatus of claim 5 wherein said means for forming said sum and difference signals includes a set of Doppler filters for filtering said target return signals.

7. The apparatus of claim 5 wherein said means for generating a power spectrum representation includes means for determining the Fourier transform of said time-sampled sequence of $\Sigma^*\Delta$ signals.

8. The apparatus of claim 7 further including means for estimating power of said target return signal, said means for estimating including means for filtering said power spectrum representation.

9. The apparatus of claim 8 further including means for generating a target track signal in accordance with said estimated magnitude of said target return signal.

10. A method for detecting multipath interference in forming two complex signals A and B from different combinations of antenna elements, multiplying the time samples of A with corresponding B samples to form a time-sampled sequence of AB signals, in a radar receiver, comprising the steps of:

forming sum and difference signals by time-sampling a target return signal;

forming the complex conjugate of the sum signals;

multiplying samples of the complex conjugate sum signals with their associated complex difference signals so as to form a time-sampled sequence of sum and difference signals; and generating a power spectrum representation of the time-sampled sequence of signal sum conjugate difference within the presence of selected spectral components within said spectral representation is indicative of the existence of multipath interference in said radar receiver.

\* \* \* \* \*